(12) United States Patent
Gochberg et al.

(10) Patent No.: US 11,319,236 B2
(45) Date of Patent: May 3, 2022

(54) GLASS FINING USING AN OBJECTIVE AND MOLTEN METAL

(71) Applicant: Owens-Brockway Glass Container Inc., Perrysburg, OH (US)

(72) Inventors: Lawrence Gochberg, Sylvania, OH (US); Casey Townsend, Perrysburg, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 370 days.

(21) Appl. No.: 16/668,136

(22) Filed: Oct. 30, 2019

(65) Prior Publication Data

US 2021/0292210 A1    Sep. 23, 2021

(51) Int. Cl.
*C03B 5/225* (2006.01)
*C03B 5/235* (2006.01)

(52) U.S. Cl.
CPC .......... *C03B 5/2257* (2013.01); *C03B 5/2356* (2013.01); *C03B 2211/22* (2013.01)

(58) Field of Classification Search
CPC ..... C03B 5/2257; C03B 40/00; C03B 40/033; C03B 40/002
See application file for complete search history.

(56) References Cited

U.S. PATENT DOCUMENTS

| 2,485,851 A | 10/1949 | Stevens |
| 2,911,759 A | 11/1959 | Pilkington et al. |
| 3,083,551 A | 4/1963 | Pilkington et al. |
| 3,871,854 A | 3/1975 | Milnes |
| 3,925,052 A | 12/1975 | Hummel |
| 4,214,886 A | 7/1980 | Shay et al. |
| 4,295,873 A * | 10/1981 | Trutner .................... C03B 9/34 65/102 |

(Continued)

FOREIGN PATENT DOCUMENTS

| CN | 107716196 A | 2/2018 |
| GB | 1389881 | 4/1975 |

(Continued)

OTHER PUBLICATIONS

PCT Int. Search Report and Written Opinion, Int. Application No. PCT/US2020/057471, Int. Filing Date: Oct. 27, 2020, Applicant: Owens-Brockway Glass Container Inc., dated Feb. 12, 2021.

(Continued)

*Primary Examiner* — Alison L Hindenlang
*Assistant Examiner* — Steven S Lee

(57) ABSTRACT

A glass refining system, glass refining device, and method are disclosed. The apparatus in accordance with one aspect of the disclosure includes an objective having a laterally outer extremity, where a molten metal stream flows from an opening in the objective and over the objective, and separates from the objective at a molten metal separation location that is inboard of the extremity; and a molten metal receptacle disposed below the objective and configured to receive the molten metal stream, wherein a molten glass stream flows downwardly toward the objective and over the molten metal stream, and wherein the molten glass stream separates from the molten metal stream at a molten glass separation location that is laterally outboard of the molten metal separation location and flows into a molten glass receptacle.

20 Claims, 2 Drawing Sheets

(56) References Cited

U.S. PATENT DOCUMENTS

| | | | |
|---|---|---|---|
| 4,610,711 A * | 9/1986 | Matesa | C03B 5/225 65/134.9 |
| 4,764,198 A * | 8/1988 | Lythgoe | C03B 5/43 65/339 |
| 4,786,320 A | 11/1988 | Hobson et al. | |
| 9,896,367 B2 | 2/2018 | Bisson et al. | |
| 10,011,511 B2 | 7/2018 | Kersting | |
| 10,202,300 B2 | 2/2019 | Hart et al. | |
| 10,202,303 B2 | 2/2019 | Boek et al. | |
| 2017/0240450 A1 | 8/2017 | Meng et al. | |

FOREIGN PATENT DOCUMENTS

| | | | |
|---|---|---|---|
| KR | 100307713 B1 * | 9/2001 | |
| WO | WO-2018081664 A1 * | 5/2018 | C03B 7/096 |

OTHER PUBLICATIONS

Lambrinou, K., "Liquid Metal Pumped at a Recod Temperature", Nature, vol. 550, Research News and Views, Date: Oct. 12, 2017, p. 194.
Amy, C., et al., "Pumping Liquid Metal at High Temperatures Up to 1,673 Kelvin", Nature, vol. 550, Article, Date: Oct. 12, 2017, p. 199.

* cited by examiner

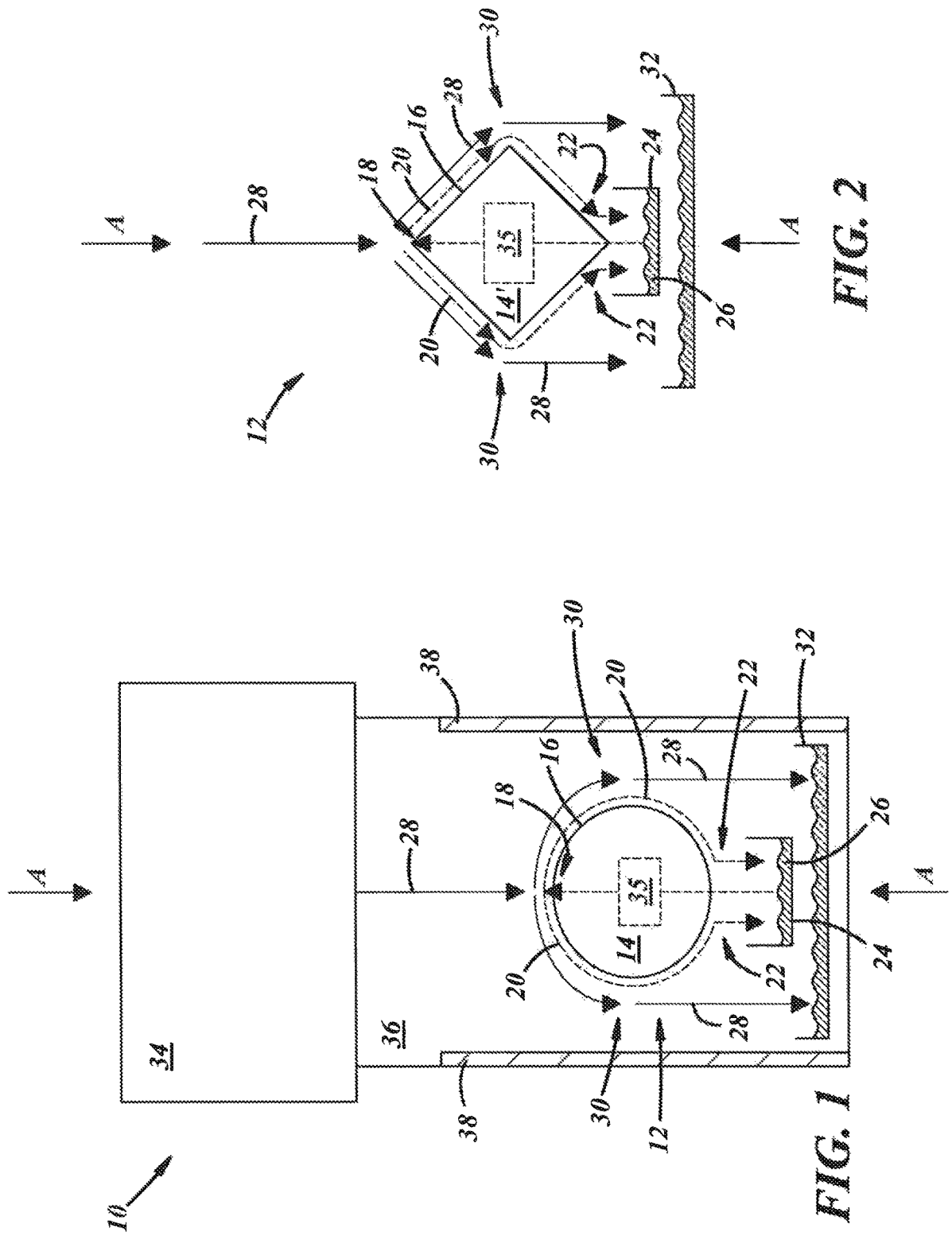

GLASS FINING USING AN OBJECTIVE AND MOLTEN METAL

The present disclosure is directed to glass container manufacturing, and more particularly, refining molten glass.

BACKGROUND

Submerged combustion melting ("SCM") is based on enhancing heat transfer by mixing combustible fuels and oxidants with raw glass material and firing the fuels and oxidants directly into and under the surface of the glass material to be melted. The contact between the raw glass material and the combusting fuels and oxidants generates a bubbling bath of molten glass with high rates of mass and heat transfer. During this process, gases can be produced, which may evolve to form gas bubbles within the molten glass. The process of removing the gas bubbles from molten glass can be referred to as fining or refining. Refining can occur inside or outside of a furnace or tank, such as in downstream refining chambers.

BRIEF SUMMARY OF THE DISCLOSURE

The present disclosure embodies a number of aspects that can be implemented separately from or in combination with each other.

An apparatus for fining molten glass in accordance with one aspect of the disclosure includes an objective having a laterally outer extremity, where a molten metal stream flows from an opening in the objective and over the objective, and separates from the objective at a molten metal separation location that is inboard of the extremity; and a molten metal receptacle disposed below the objective and configured to receive the molten metal stream, wherein a molten glass stream flows downwardly toward the objective and over the molten metal stream, and wherein the molten glass stream separates from the molten metal stream at a molten glass separation location that is laterally outboard of the molten metal separation location and flows into a molten glass receptacle.

A system for fining molten glass in accordance with one aspect of the disclosure includes a glass melter for providing a molten glass stream; an apparatus configured for fining the molten glass stream, the apparatus including an objective having a laterally outer extremity, where a molten metal stream flows from an opening in the objective and over the objective and separates from the objective at a molten metal separation location that is inboard of the extremity; and a molten metal receptacle disposed below the objective and configured to receive the molten metal stream, wherein the molten glass stream flows downwardly toward the objective and over the molten metal stream, and wherein the molten glass stream separates from the molten metal stream at a molten glass separation location that is laterally outboard of the molten metal separation location; and an enclosure for enclosing the apparatus.

A method of fining molten glass in accordance with one aspect of the disclosure includes flowing a molten metal stream downwardly over an objective having a laterally outer extremity, wherein the molten metal stream separates from the objective at a molten metal separation location that is inboard of the extremity; receiving the molten metal stream in a molten metal receptacle below the objective; flowing a molten glass stream downwardly toward the objective and over the molten metal stream flowing over the objective, wherein the molten glass stream separates from the molten metal stream at a molten glass separation location that is laterally outboard of the molten metal separation location; and receiving the molten glass stream in a molten glass receptacle below the objective. In some instances, the method can include recirculating the molten metal stream from the molten metal receptacle to the objective.

BRIEF DESCRIPTION OF THE DRAWINGS

The disclosure, together with additional objects, features, advantages and aspects thereof, will be best understood from the following description, the appended claims and the accompanying drawings, in which:

FIG. 1 is a schematic cross-sectional view illustrating a system and an apparatus for fining molten glass including a molten glass stream flowing over a molten metal stream and a spherical objective, in accordance with an illustrative embodiment of the present disclosure.

FIG. 2 is a schematic cross-sectional view illustrating the apparatus in FIG. 1 having a polyhedral objective, in accordance with an illustrative embodiment of the present disclosure.

DETAILED DESCRIPTION

Figure 3:
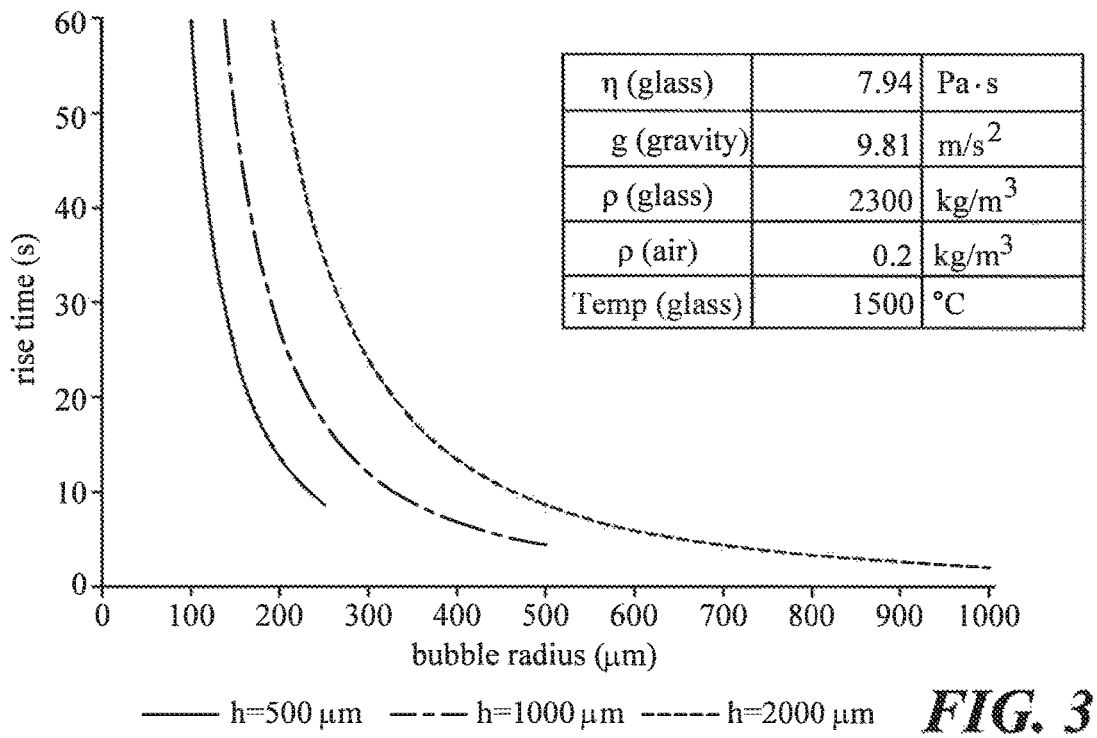
FIG. 3 is a graphical depiction of bubble rise time based on bubble radius and glass layer thickness, in accordance with an illustrative embodiment of the present disclosure.

A general object of the present disclosure, in accordance with at least one aspect of the disclosure, is to refine molten glass by removing gas bubbles from the molten glass formed during a melting process, for example in a submerged combustion melter, by using an objective to create a thin layer of molten glass flowing over a layer of molten metal on the objective.

Submerged combustion melting ("SCM") can be an efficient method for melting glass. SCM is based on enhancing heat transfer by mixing combustible fuels and oxidants with raw glass material and firing the fuels and oxidants directly into and under the surface of the glass material to be melted. The contact between the raw glass material and the combusting fuels and oxidants generates a bubbling bath of molten glass along with high rates of mass and heat transfer. However, the bubbling bath of molten glass produces a large amount of gas bubbles in the molten glass. These bubbles are typically removed from the glass melt before the molten glass can be formed into a commercial product (e.g., a glass container) in a process called fining or refining.

One method for removing the gas bubbles from the molten glass is refractory channel thermal fining. However, this type of fining can take too much time for the bubbles to rise to the surface of the molten glass melt and break. Additionally, refractory channel thermal refining can require an expensive refractory structure, which, during extended operation, can easily wear out, requires high maintenance, and lacks flexibility. Plus, the thermal fining channel occupies a large footprint and valuable manufacturing space. Other equipment used in the thermal fining process can also be corroded by the molten glass.

Consequently, the present disclosure is directed to a system, apparatus, and method that refine molten glass by removing gas bubbles formed during the melting process using a layer of thin molten glass that flows over a layer of molten metal flowing over an objective. Gas bubbles can easily escape the thin layer of molten glass, and corrosion of portions of the system is reduced/eliminated because of the molten metal boundary between the objective and the corrosive molten glass layer. By using the system, apparatus, and method described herein, the efficiency of fining gas bubbles from the molten glass stream is increased because of the thin glass layer and residency time and erosion is eliminated/prevented as the molten glass stream falls and impinges the molten metal layer instead of the objective.

FIGS. 1-2 illustrate a system 10 and an apparatus 12 in accordance with illustrative embodiments of the present disclosure. Like numerals among the embodiments generally designate like or corresponding elements throughout the several views of the drawing figures.

As illustrated in FIGS. 1 and 2, the system 10 can include the apparatus 12 configured for refining molten glass. The apparatus 12 can further include an objective 14 having a lateral outer extremity 16, where a molten metal stream 20 may flow out of and over the objective 14 from an opening 18 in the objective 14. In some instances, the objective 14 may not include an opening, and the molten metal stream 20 may flow onto the objective 14 from another source, for example a spout disposed above the objective 14. The objective 14 can serve to distribute the molten glass stream 28 into a thin layer and to increase bubble rise time when fining the molten glass stream 28.

FIG. 3 illustrates a graphical depiction of exemplary bubble rise times for three different glass layer thicknesses when using the apparatus 12. In FIG. 3, the glass temperature is 1500° C., the glass viscosity $\eta$ is 7.94 Pa·s, the air density $\rho$ is 0.2 kg/m$^3$, and the glass density $\rho$ is 2300 kg/m$^3$. The bubble rise time (s) in seconds is shown dependent on bubble radius ($\mu$m) and glass layer thickness (h) (e.g., h=500 $\mu$m, h=1000 $\mu$m, and h=2000 $\mu$m). As shown, when the bubble radius is between about 100 $\mu$m and about 200 $\mu$m, the rise time for all three glass layer thicknesses is approximately 60 seconds or less, which is less time than using conventional methods. It will be appreciated that the apparatus 12 may be operated under a variety of process conditions, including different temperatures, vacuums, glass layer thicknesses, and so forth.

The objective 14 can be formed from, for example, refractory material and/or a metal with a high melting point (e.g., tungsten, tantalum, platinum, niobium, molybdenum, rhenium and the like). The objective 14 may also be formed from a material that is resistant to corrosion from the molten metal stream 20 and/or molten glass. The objective 14 can include various 3D shapes, for example, a sphere, a rectangular box, and/or any polyhedron. Additionally, the objective 14 can include a concave, convex, and/or flat surface. The opening 18 can be disposed so that a molten metal stream 20 can flow from the objective 14 and over the laterally outer extremity 16 of the objective 14. In the example illustrated in FIG. 1, the objective 14 can include a sphere with the opening 18 located at a top (e.g., disposed closest to a glass melter 34) of the sphere. In the example illustrated in FIG. 2, the objective 14' can include a square box with the opening 18 at the top (e.g., a corner of the box disposed closest to a glass melter 34) of the square box. It will be appreciated that the objective 14 may include other shapes and configurations, for example an oval, a rectangular box, walls, a pole, and/or any configuration with an edge where surface tension of the molten metal allows the molten metal to cling to the surface of the objective 14 around the edge. It is contemplated that the opening 18 may be disposed at other locations on the objective 14 and that the objective 14 may include any smooth surface or structure disposed in the path of a molten glass stream 28.

In embodiments, the objective 14 may include a heater (not shown) for providing heat to the laterally outer extremity 16. Additionally, the objective 14 may include plumbing and/or a pump 35 for flowing the molten metal stream 20 through the opening 18. The plumbing/pump 35 may include, for example and without limitation, a gear pump comprising materials (e.g., ceramics, graphite, tungsten, and the like) that can withstand a high temperature and/or a high corrosion environment. Additionally, the pump 35 may be disposed at various locations. For example, the pump 35 may be located within the objective 14, where a feed tube dips into molten metal in a molten metal receptacle 24 directly below the objective 14, where the pump 35 can pump the molten metal from the feed tube directly to the opening 18 and/or through an outlet tube to the opening 18. In another example, the pump 35 may be disposed within and/or below the molten metal receptacle 24, where the pump 35 can pump the molten metal through an outlet tube and the objective 14 to the opening 18. In another example, the pump 35 may be located external to enclosure 36 and may use a feed tube and/or an output tube to pump the molten metal. The pump 35 may be disposed and may be operable at a variety of other locations.

As the molten metal stream 20 flows from the opening 18 in the objective 14, it can smoothly flow from the opening 18 and over the surface of the objective 14 such that the flow of the molten metal stream 20 is laminar. The molten metal stream 20 over the objective can flow as a thin film of liquid that follows the surface of the objective 14 and reaches a molten metal separation location 22. The molten metal separation location 22 can be disposed inboard of the laterally outer extremity 16 and/or proximate to a bottom (e.g., distal from the opening 18, distal from the glass melter 34, and the like) of the objective 14. At the molten metal separation location 22, the molten metal stream 20 can separate and fall downwardly from the objective 14.

The apparatus 12 can include a molten metal receptacle 24 disposed below the objective 14. As the molten metal stream 20 separates and falls from the objective 14, the molten metal receptacle 24 functions to receive and collect the falling molten metal stream 20 in a pool 26 of molten metal. The molten metal receptacle 24 can be formed from a material that has a high melting point and may be corrosion resistant, for example, tungsten, tantalum, platinum, niobium, molybdenum, rhenium and the like. In the embodiments illustrated in FIGS. 1 and 2, the molten metal receptacle 24 is shown as a pan. However, the molten metal receptacle 24 can include other forms and configurations that are configured to receive and/or contain the molten metal stream 20 falling from the objective 14.

In some instances, the molten metal receptacle 24 can include means for recirculating the molten metal stream 20. For example, the molten metal receptacle 24 can include a pump and/or plumbing (not shown) for moving and recirculating the molten metal stream 20 to the objective 14. In this example, the pump can pump the molten glass stream through plumbing to the objective 14 and/or to the opening 18. Moreover, the molten metal receptacle 24 may include a heater (not shown) for heating and/or maintaining temperature of the molten metal stream 20.

The system 10 can include a glass melter 34 for providing a molten glass stream 28. The glass melter 34 can melt raw glass material and can provide the molten glass stream 28 to the apparatus 12 and objective 14. The apparatus 12 may be coupled to and/or disposed proximate to the glass melter 34. The glass melter 34 can include, for example, a submerged combustion melter. During glass melting, submerged combustion melters fire fuel and oxidants directly into and under the surface of the glass material to be melted, which generate a large amount of gas bubbles in the molten glass. It will be appreciated that the glass melter 34 may include a variety of types of glass melters other than or in addition to a submerged combustion melter. Additionally, the glass melter 34 may include a forehearth (not shown), a spout (not shown) for dispensing the molten glass stream 28, an orifice (not shown) configured to control the flow of the molten glass stream 28, and/or other devices for providing the molten glass stream 28. The glass melter 34 and the objective 14 may be aligned with the vertically inline refining axis A.

The molten glass stream 28 can flow from the glass melter 34 and downwardly toward the objective 14 and over the molten metal stream 20. The molten glass stream 28 forms a thin layer as it flows over the molten metal stream 20. The gas bubbles in the molten glass stream 28 can more efficiently be released because of the thin layer of glass. The extra surface area created by the objective 14 can also provide a longer flow path for the molten glass stream 28 thus increasing the residency time of the molten glass stream 28 and time for the gas bubbles to escape the molten glass stream 28. Additionally, the molten metal stream 20 protects the objective 14 from the corrosive molten glass stream 28, thus reducing corrosion and preserving the integrity of the objective 14. As the molten glass stream 28 flows over the molten metal stream 20, there is no mixing because the molten glass stream 28 and the molten metal stream 20 are immiscible. Moreover, since the molten glass stream 28 is only in brief contact with the molten metal stream 20, there is not sufficient time for significant diffusion of the molten metal stream 20 into the molten glass stream 28.

Fining of the molten glass stream 28 may be performed at a variety of molten glass and molten metal temperatures. For example, the viscosity, density, and surface tension of molten glass is approximately 2.3 Pa-s, 2300 kg/m$^3$, and 0.3 N/m, respectively, at 1500° C. One example of molten metal that may be used herein can include molten steel, which, at 1500° C., the viscosity, density, and surface tension are approximately 0.6 Pa-s, 7010 kg/m$^3$, and 1.7 N/m, respectively. Another example of molten metal that may be used herein can include molten tin, which at 1200° C., the viscosity, density, and surface tension are approximately 0.7 Pa-s, 6280 kg/m$^3$, and 0.47 N/m, respectively. In these circumstances, the molten metal stream 20 can be thin, smooth, and laminar when the flow velocity is controlled so that the Reynolds number is below the turbulent transition. The molten glass stream 28 can also be thin, smooth, and laminar when the flow velocity is controlled. Because the molten glass stream 28 is a thin, laminar layer, gas bubbles can efficiently escape from the molten glass stream 28 resulting in fined molten glass. When below 1500° C., fining can be performed when the molten metal stream 20 and/or the molten glass stream 28 by using a molten metal stream 20 that melts below the fining temperature (e.g., temperature of the molten glass stream 28).

The molten metal stream 20 serves as a boundary layer between the molten glass stream 28 and the objective 14 and creates a zero shear condition instead of a no-slip (zero velocity) boundary condition. Thus, there is no mechanism other than gravity to keep the molten glass stream 28 in contact with the molten metal stream 20, and the molten glass stream 28 separates from the molten metal stream 20 at a molten glass separation location 30 and falls vertically into a molten glass receptacle 32. As the molten glass stream 28 reaches the molten glass in the molten glass receptacle 32, it can be substantially fined. The molten glass receptacle 32, can include any container and/or device configured for containing and/or receiving the molten glass stream 28 falling from the objective 14. Additionally, the molten glass receptacle 32 can be located below but configured wider than the molten metal receptacle 24. The molten glass receptacle 32 may be formed from materials that are resistant to high heat and corrosion from the molten glass stream 28 (e.g., platinum, refractory material, and the like). Additionally, the molten glass receptacle 32 may include an exit for the refined glass to flow to downstream processes.

The molten glass separation location 30 can be disposed laterally outboard of the molten metal separation location 22 and at a location that is 90° from vertical on the objective 14. In other words, the molten glass separation location 30 can be disposed at a point on the objective 14 farthest from axis A. FIG. 1 illustrates the molten glass separation location 30 at an edge of the sphere that is 90° from vertical on the objective 14. FIG. 2 illustrates the molten glass separation location 30 at a corner of the square box objective 14. As shown in the examples in FIGS. 1 and 2, the objective 14 can be configured so that the molten glass stream 28 separates from the molten metal stream 20 sooner than the molten metal stream 20 separates from the objective 14. Thus, the molten glass stream 28 can be separated efficiently from the molten metal stream 20.

In some embodiments, the apparatus 12 may include an enclosure 36 that surrounds the molten glass stream 28, the objective 14, the molten metal receptacle 24, and/or the molten glass receptacle 32. The enclosure 36 can provide a closed space for fining the molten glass stream 28 and may serve to provide insulation to the apparatus 12 for maintaining the high temperature of the molten glass stream 28, the molten metal stream 20, and/or other components of the apparatus 12, and, in turn, maintain the low viscosity and facilitate efficient fining of the molten glass stream 28. The enclosure 36 can include highly reflecting walls configured to minimize the amount of heat lost from the system 10 and apparatus 12. In some instances, the apparatus 12 and/or the enclosure 36 may include at least one thermal radiation shield 38, also for insulating the apparatus 12 from heat loss and/or reflecting radiated heat back into the apparatus 12. It will be appreciated that the system 10 and apparatus 12 may utilize other means for retaining heat.

Figure 4:
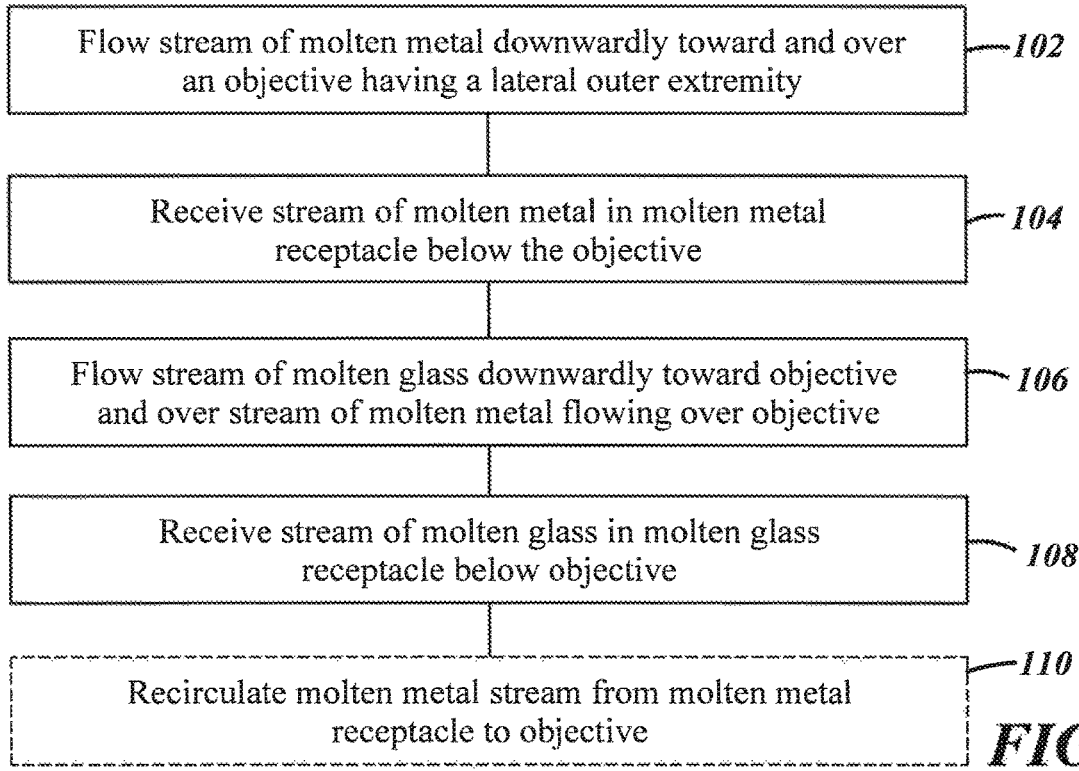
FIG. 4 is a flow diagram showing various steps of an illustrative embodiment of a method for fining glass using the system and apparatus FIGS. 1 and 2, including the molten glass stream flowing over the molten metal stream and the objective.

FIG. 4 illustrates an example of a method 100 for fining molten glass using the objective 14 and the molten metal stream 20 flowing over the objective 14. For purposes of illustration and clarity, method 100 will be described in the context of the system 10 and apparatus 12 described above and illustrated in FIGS. 1 and 2. It will be appreciated, however, that the application of the present methodology is not meant to be limited solely to such an arrangement, but rather method 100 may find application with any number of arrangements (i.e., steps of method 100 may be performed by components of the system 10 other than those described below, or arrangements of the system 10 other than that described above).

In an embodiment, method 100 comprises a step 102 of flowing a molten metal stream 20 downwardly over the objective 14 having a laterally outer extremity 16. In an implementation, flowing the molten metal stream 20 can include using at least one pump (not shown) to flow the molten metal stream 20 from inside the objective 14 and through the opening 18 in the laterally outer extremity 16. In one instance, a pump may be disposed within the objective 14 for flowing the molten metal stream 20. In another instance, a pump may be disposed outside the objective 14, for example proximate to and/or as part of the molten metal receptacle 24 and may pump the molten metal stream 20 into and/or through the objective 14. In yet another instance, the molten metal stream 20 may be pumped to a location outside of and over the objective 14. In this instance, the molten metal stream 20 may be dispensed over and above the objective 14 so that the molten metal stream 20 impinges directly on and flows over the surface of the objective 14 to create the boundary layer for the molten glass stream 28. Additionally, flowing the molten metal stream 20 can include adjusting the molten metal stream 20 flow rate to be laminar so that the molten metal stream 20 flows in a smooth manner over the outer surface of the objective 14 and separates from the objective at a molten metal separation location 22.

Method 100 comprises a step 104 of receiving the molten metal stream 20 in a molten metal receptacle 24 disposed below the objective 14. Receiving the molten metal stream 20 can include positioning the molten metal receptacle 24 below the objective 14 and the molten metal separation location 22. The molten metal separation location 22 may be located inboard of the laterally outer extremity 16 and/or proximate to the vertically inline refining axis A.

Method 100 includes a step 106 of flowing the molten glass stream 28 downwardly toward the objective 14 and over the molten metal stream 20 flowing over the objective 14. Flowing the molten glass stream 28 can include melting a batch of raw glass material in the glass melter 34 by mixing combustible fuels and oxidants with the raw glass material and firing the fuels and oxidants directly into and under the surface of the glass material to be melted. Additionally, flowing the molten glass stream 28 may include using a forehearth, spout and/or orifice to dispense the molten glass stream 28 from the glass melter 34 in alignment with the vertically inline refining axis A in a downward direction toward the objective 14. As the molten glass stream 28 flows toward and impinges upon the objective 14, the molten glass stream 28 can flow over the molten metal stream 20 that flows over the surface of the objective 14.

In some instances, flowing the molten glass stream 28 may include controlling the desired temperature, flow rate, viscosity, and/or stream size of the molten glass stream 28. For example, flowing the molten glass stream 28 can include adjusting the flow rate of the molten glass stream 28 to be laminar with a low viscosity as it flows over the molten metal stream 20 and the objective 14. Providing low viscosity and a laminar flow rate can facilitate a thin layer of molten glass flowing over the molten metal stream 20, thus encouraging the efficient migration and release of the gas bubbles from the molten glass stream 28. Flowing the molten glass stream 28 can also include causing the molten glass stream 28 to flow to the molten glass separation location 30 located laterally outboard of the molten metal separation location 22 and separate from the molten metal stream 20. This ensures that the separation of the molten glass stream 28 from the molten metal stream 20 occurs prior to the separation of the molten metal stream 20 from the objective 14 and ensures that both streams can be collected separately.

Method 100 can include a step 108 of receiving the molten glass stream 28 in a molten glass receptacle 32 disposed below the objective 14. Receiving the molten glass stream 28 can include positioning the molten glass receptacle 32 below the objective 14, the molten metal receptacle 24, and the molten glass separation location 30. As previously discussed, the molten glass separation location 30 may be located at the edges of the objective 14 (e.g., 90° vertical from the objective 14), and the molten glass receptacle 32 can receive and contain the molten glass stream 28. In some instances, receiving the molten glass stream 28 may include flowing the received molten glass from the apparatus 12 to a downstream process step.

In some instances, method 100 may include a step 110 of recirculating the molten metal stream 20 from the molten metal receptacle 24 to the objective 14. In this step, the molten metal in the molten metal receptacle 24, which may have been previously received and collected from the molten metal stream 20 falling from the objective 14, can flow and/or be pumped from the molten metal receptacle 24 again to the opening 18 and/or the objective 14. For example, a pump located proximate to and/or as a part of the molten metal receptacle 24 can pump the molten metal in the molten metal receptacle 24 to the objective 14 and through the opening 18 to recirculate the molten metal stream 20. The molten metal stream 20 can then flow over the objective 14 and return to the molten metal receptacle 24 forming a recirculated molten metal stream 20.

There thus has been disclosed a glass refining system and apparatus using an objective and a molten metal stream flowing over the objective that fully satisfies one or more of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments for expedience. The disclosure is intended to embrace all such modifications and variations as fall within the spirit and broad scope of the appended claims.

The invention claimed is:

1. An apparatus for fining molten glass, comprising:
an objective having a laterally outer extremity, where a molten metal stream flows from an opening in the objective and over the objective, and separates from the objective at a molten metal separation location that is inboard of the extremity; and
a molten metal receptacle disposed below the objective and configured to receive the molten metal stream,
wherein a molten glass stream flows downwardly toward the objective and over the molten metal stream, and wherein the molten glass stream separates from the molten metal stream at a molten glass separation location that is laterally outboard of the molten metal separation location and flows into a molten glass receptacle.

2. The apparatus in claim 1, wherein the objective is spherical.

3. The apparatus in claim 1, wherein the objective is polyhedral.

4. The apparatus in claim 1, wherein the objective is composed of a refractory material.

5. The apparatus in claim 1, wherein the objective is composed of tungsten, tantalum, platinum, or some other high-melting-point metal.

6. The apparatus in claim 1, wherein the molten metal stream flow is laminar.

7. The apparatus in claim 1, wherein the molten metal stream comprises at least one of steel, a steel alloy, or tin.

8. The apparatus in claim 1, wherein the molten glass stream flow is laminar.

9. The apparatus in claim 1, wherein the molten glass stream and the molten metal stream are immiscible.

10. A system for fining molten glass, comprising:
a glass melter for providing a molten glass stream;
an apparatus configured for fining the molten glass stream, the apparatus including
an objective having a laterally outer extremity, where a molten metal stream flows from an opening in the objective and over the objective and separates from the objective at a molten metal separation location that is inboard of the extremity; and
a molten metal receptacle disposed below the objective and configured to receive the molten metal stream,
wherein the molten glass stream flows downwardly toward the objective and over the molten metal stream, and wherein the molten glass stream separates from the molten metal stream at a molten glass separation location that is laterally outboard of the molten metal separation location; and
an enclosure for enclosing the apparatus.

11. The system in claim 10, wherein the enclosure includes at least one reflecting wall configured to retain heat within the enclosure.

12. The system in claim 10, further comprising:
at least one thermal radiation shield configured to retain heat within the enclosure.

13. A method of fining molten glass, comprising the steps of:
flowing a molten metal stream downwardly over an objective having a laterally outer extremity, wherein the molten metal stream separates from the objective at a molten metal separation location that is inboard of the extremity;
receiving the molten metal stream in a molten metal receptacle below the objective;
flowing a molten glass stream downwardly toward the objective and over the molten metal stream flowing over the objective, wherein the molten glass stream separates from the molten metal stream at a molten glass separation location that is laterally outboard of the molten metal separation location; and
receiving the molten glass stream in a molten glass receptacle below the objective.

14. The method in claim 13, wherein the objective is spherical.

15. The method in claim 13, wherein the objective is polyhedral.

16. The method in claim 13, wherein the objective is composed of a refractory material.

17. The method in claim 13, wherein the objective is composed of tungsten, tantalum, platinum, or some other high-melting-point metal.

18. The method in claim 13, wherein the molten metal stream flow is laminar.

19. The method in claim 13, wherein the molten glass stream flow is laminar.

20. The method in claim 13, further comprising:
recirculating the molten metal stream from the molten metal receptacle to the objective.

\* \* \* \* \*